Figure 1:
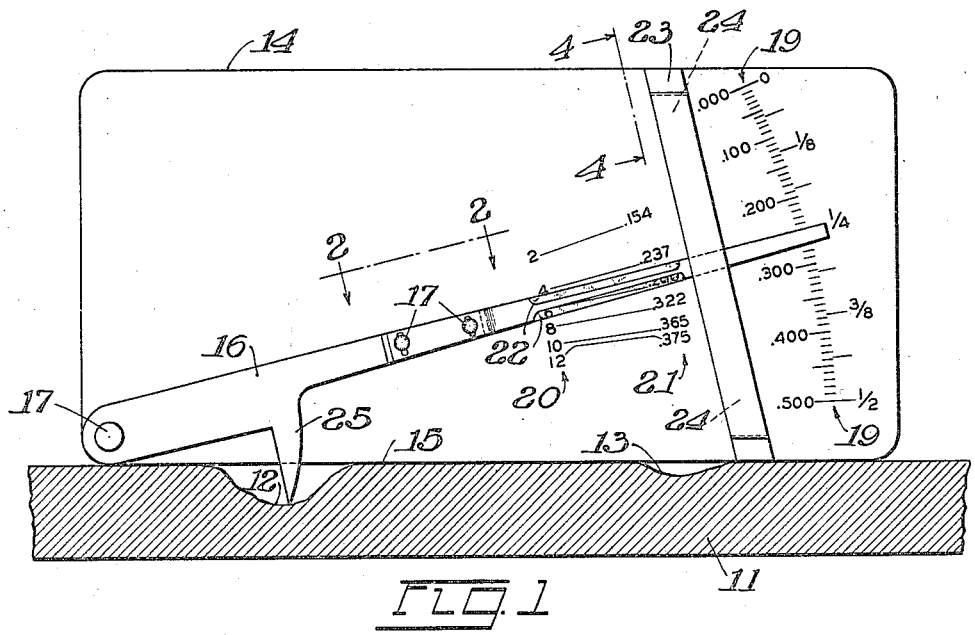

Nov. 6, 1934.                J. C. STIRLING                1,979,912
                              TESTING DEVICE
                            Filed June 22, 1933

INVENTOR
J. Campbell Stirling
BY Bruce K. Brown
ATTORNEY

Patented Nov. 6, 1934

1,979,912

UNITED STATES PATENT OFFICE 1,979,912

TESTING DEVICE

J. Campbell Stirling, Tulsa, Okla., assignor to Stanolind Pipe Line Company, Tulsa, Okla., a corporation of Maine Application June 22, 1933, Serial No. 677,042

2 Claims. (Cl. 33—172)

This invention relates to devices for the measurement of the depth of pits or other depressions in surfaces. More particularly, it relates to devices for the measurement of the depth of corrosion pits in metallic pipe and for the determination of whether or not the pipe is in safe condition for a given use.

One object of my invention is to provide a device of the character described which can be manufactured easily and inexpensively, which will possess a high degree of accuracy, and which can be used efficiently by an ordinary workman with reproducible results. A further object is to provide a device of this type which can be compensated so that it will give accurate readings regardless of wear on that portion of the device which is inserted in the pit. Another object of the invention is to provide a device which will indicate not only the depth of the corrosion pit but also the wall thickness of the pipe. A still further object is to provide a device which will indicate whether or not the pit being measured is sufficiently deep to be dangerous with reference to the particular size of pipe on which the measurement is made. Other and more detailed objects of the invention will become apparent as the description thereof proceeds.

In the past, pipe line companies and other users of large quantities of metallic pipe have encountered very great difficulty due to the unavailability of simple and satisfactory devices for the measurement of the depth of corrosion pits. The depth of a pit of this type is very deceptive to the eye and since the only efficient means of estimation of the depth has been visual inspection the result has been that great quantities of pipe have been discarded due to the fear that they contained corrosion pits too deep for safety. In other cases, pipe has been used when deep corrosion pits were present and the result has been failure of the pipe with consequent loss of the fluid being conveyed and great loss of time and money in the repair of the pipe line. Loss of life and limb may also result from the failure of pipe in certain instances due to the presence of deep corrosion pits. In still other cases, pipe has been used in high pressure portions of a pipe line or in acid soil when, if it had been conveniently possible to measure the depth of the corrosion pits, it would have been apparent that the pipe should have been used only under low pressures or in non-corroding soil. On the other hand conservatism has at times caused pipe to be used only under low pressure or non-corroding soil conditions when if it had been possible to determine the depth of the corrosion pits it could have been put to a more valuable use. Still again pipe has often been removed from a pipe line at great expense when a systematic survey of the depth of the corrosion pits by the use of the device of my invention would have shown that the pipe or much of it could be retained safely.

My device has been found extremely practical. Tests can readily be conducted to determine just what depth of pit is the maximum permissible for a given nominal pipe size and for a given use and my device can then be put in the hands of an ordinary workman to determine whether or not each length of pipe in question is suitable.

Figure 2:
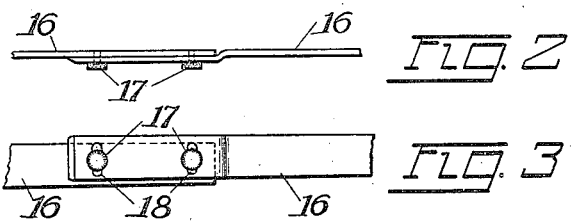
Figure 3:
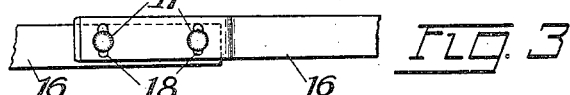
Figure 4:
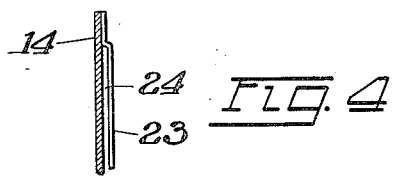

My invention can be best described by reference to the accompanying drawing which shows a preferred embodiment thereof and in which Figure 1 is an elevation showing the device in use; Figure 2 is a plan view of the compensating mechanism taken along the line 2:2 of Figure 1; Figure 3 is an elevation corresponding to Figure 2; and Figure 4 is a view of the restraining strap taken along the line 4:4 of Figure 1.

Referring now to the drawing in more detail, 11 is a cross section of the wall of the metallic pipe, the depth of whose corrosion pits is to be determined; 12 and 13 represent corrosion pits; and 14 is a flat rigid plate which may suitably be metallic and which is provided with a rectilinear lower edge 15. An indicator arm 16 is pivotally connected to sheet 14 by pivot 17 which is preferably located near a corner of plate 14 adjacent to edge 15. Indicator arm 16 is composed of two portions which are connected together by set screws 17 which may suitably co-operate with screw threads in the lower portion of indicator arm 16. The upper portion of indicator arm 16 may suitably be provided with slots 18 running in a direction perpendicular to the axis of indicator arm 16.

The upper end of indicator arm 16 cooperates with a scale or series of indicia 19, which is calibrated to show the depth of the corrosion pit being measured. Indicator arm 16 also cooperates with a scale or series of indicia 20, which shows the various nominal pipe sizes on which it is intended to use the device. A scale or series of indicia 21 is also provided in co-operative relationship to scale 19 and to scale 20 and shows the thickness of the wall of each of the nominal pipe sizes shown on scale 20. The upper edge of indicator arm 16 may suitably be used to read the corresponding figures on these various scales. Thus, if the upper edge showed "4" on scale 20 it would show ".237" on scale 21 and, in the specific embodiment shown, ".237" on scale 19. This is the thickness in inches of the wall of standard pipe of a nominal 4 inch size. The use of these various scales and suitable modifications which may be made in them will be described hereafter. The scales themselves may suitably be etched on plate 14.

It is desirable to provide that portion of indicator arm 16 which cooperates with scales 20 and 21 with transparent inserts 22 or with some other means whereby the reading of those portions of scales 20 and 21 underlying indicator arm 16 will not be unduly obstructed.

A strap 23 raised slightly above the surface of plate 14 may suitably be used to hold indicator arm 16 within groove 24 in cooperative relationship with scales 19, 20 and 21. This strap may be fastened to plate 14 at its upper and lower edges by soldering or otherwise.

Indicator arm 16 is provided with a downwardly protruding projection or hardened contact finger 25 which may suitably be of the shape shown. The length of projection 25 and its position on indicator arm 16 are adjusted so that scale 19 can be calibrated to cover the entire range of corrosion pit depths which may be encountered. The distance from pivot 17 to scale 19 should preferably be from two and one-half to seven times the distance from pivot 17 to finger 25.

When the device is to be used, the pipe or other surface the depth of whose pits is to be determined, is cleaned, for instance by wire brushing, pickling, etc., in order to clean out the pits and provide a smooth rectilinear surface to be contacted by edge 15 of plate 14. In the case of a metallic pipe, plate 14 is then placed in position with its lower edge 15 parallel to the axis of the pipe and in substantially continuous contact with the pipe wall in such a position that finger 25 will enter the corrosion pit. Indicator arm 16 is raised during this operation and then dropped so that finger 25 will penetrate to the bottom of the pit. It is highly desirable that finger 25 be located between pivot 17 and scales 19, 20 and 21. If finger 25 is located beyond pivot 17 it is necessary to operate the device by raising indicator arm 16 in order to obtain the insertion of the finger into the pit. This makes for considerable inaccuracy since the inevitable tendency is to raise edge 15 out of contact with the surface of the pipe.

Scale 19, having been calibrated by means of a surface containing depressions of known depth, is then read at the point of contact with the upper edge of indicator arm 16 and indicates the depth of the corrosion pit. Scale 19 may suitably be calibrated both in hundredths of an inch and in fractional parts of an inch as in Figure 1.

The depth of the corrosion pit having been determined it becomes desirable to determine the thickness of the pipe wall in order to ascertain the degree of danger attendant on the use of the pipe. This is done by bringing the upper edge of indicator arm 16 into contact with the indication showing the nominal size of the pipe, the depth of whose corrosion pit is being determined. Scale 21 at the point of contact with the upper edge of indicator arm 16 will then show the wall thickness of the pipe.

Another and highly desirable manner in which scales 19, 20 and 21 can be used is to so calibrate the device that scale 20 will cooperate with indicator arm 16 and with scale 19 to show for a corrosion pit of the indicated depth which nominal pipe sizes are completely penetrated, which are dangerous and which can be used safely. Thus, in the specific embodiment shown in Figure 1 wherein scales 19 and 21 are calibrated on the same basis, that is, wherein indicator arm 16 will give the same reading on both scales, the numbers showing above the upper edge of indicator arm 16 indicate nominal pipe sizes whose wall thicknesses are less than the depth of the pit measured. If, therefore, the number on scale 20 corresponding to the nominal size of the pipe being measured shows above indicator arm 16 the pipe in question has been completely penetrated. On the other hand, if the nominal pipe size is covered by indicator arm 16 (visible through transparent inserts 22) then the depth of the corrosion pit is less than the wall thickness but is so close to it that the use of the pipe would be dangerous. On the other hand, if the nominal pipe size shows below indicator arm 16, the depth of the corrosion pit is sufficiently less than the wall thickness so that the pipe can be used with safety.

Many modifications for accomplishing full cooperation between scales 19, 20 and 21 will occur to those skilled in the art. Thus, for example, that portion of indicator arm 16 covering scale 20 could be transparent and provided with three indicating lines cooperating with scale 20 in such manner that nominal pipe sizes above the top line would be completely penetrated; nominal pipe sizes showing between the top line and the middle line would be extremely dangerous; nominal pipe sizes showing between the center line and the lower line could be used under restricted conditions, for instance low pressure and non-corroding soil; and nominal pipe sizes showing below the bottom line could be used safely under any conditions.

Also, additional scales can be provided similar to scale 20 but shifted to provide different tolerances. These different scales may be designated by the conditions of service, e. g.—pressure, soil, etc.

Through continued use the point of finger 25 will, of course, be worn down with the result that the readings on the various scales will become erroneous. This can be compensated for by loosening set screws 17 and sliding the upper portion of indicator arm 16 in slots 18 to the zero position when the instrument is placed on a flat surface.

Although I have described my invention in connection with certain specific embodiments thereof it is to be understood that I do not wish to be limited thereby but only by the scope of the appended claims in which I have set forth the novel features of my invention.

I claim:

1. A device for measuring the depth of a corrosion pit in a metallic pipe, comprising a flat rigid plate bounded on its lower edge by a straight line, said edge being adapted to contact the outer surface of said metallic pipe in a position parallel to the axis of the pipe, a rigid indicator arm, a pivot rotatably connecting said indicator arm with said plate at a point near the lower edge of said plate, a series of indicia carried by said plate in cooperative relationship with said indicator arm for indicating the depth of said corrosion pit, a second series of indicia carried by said plate in cooperative relationship with said indicator arm for indicating dimensions of pipe for which the device may be used, said indicator arm being arranged to extend transversely across each of the said series of indicia and being arranged to indicate, at one edge of the arm, with respect to said first named series of indicia, the actual corrosion pit depth and to indicate at another point on one edge of said arm, with respect to said second named series of indicia, the pipe dimensions wherein the wall thickness is such as to permit the safe use of the pipe having corrosion pits of the depth measured at the first named edge of said indicator arm, and a contact finger for insertion in said corrosion pit carried by said indicator arm at a point intermediate said pivot and the two said series of indicia, said finger being in cooperative relationship with said arm and with said first mentioned series of indicia for measuring the depth of said corrosion pit when said lower edge of said plate is in substantially continuous contact with the outer surface of a metallic pipe and in a position parallel to the axis of said pipe and said finger is inserted in said corrosion pit.

2. A device for testing metallic pipe for corrosion pits, comprising a flat rigid plate bounded on its lower edge by a straight line, said edge being adapted to contact the outer surface of said metallic pipe in a position parallel to the axis of the pipe, a rigid indicator arm, a pivot rotatably connecting said indicator arm with said plate at a point near the lower edge of said plate, a contact finger having a pointed end for insertion in a corrosion pit in said pipe carried by said indicator arm at a point intermediate said pivot and the outer end of the arm, and a series of indicia carried by said plate in cooperative relationship with said indicator arm for indicating dimensions of pipe for which the device may be used, said indicator arm being arranged to extend transversely across said series of indicia and being arranged with respect to the said edge of said plate and said contact finger to indicate, at one edge of the arm with respect to said series of indicia, the pipe dimensions wherein the wall thickness is such as to preclude the safe use of the pipe having corrosion pits of a depth within which said contact finger is inserted.

J. CAMPBELL STIRLING.